United States Patent [19]

Jackson et al.

[11] 4,164,112

[45] Aug. 14, 1979

[54] BLADE ASSEMBLY FOR LAWN MOWERS

[75] Inventors: Harold P. Jackson, McDonough; Clifford H. Boylston, Conyers, both of Ga.

[73] Assignee: McDonough Power Equipment, Inc., McDonough, Ga.

[21] Appl. No.: 854,539

[22] Filed: Nov. 25, 1977

[51] Int. Cl.² .......................................... A01D 55/18
[52] U.S. Cl. ...................................... 56/295; 56/320.2
[58] Field of Search ................... 56/295, 320.1, 320.2; 83/608

[56] References Cited

U.S. PATENT DOCUMENTS

| | | | |
|---|---|---|---|
| 283,056 | 8/1883 | Yocom, Jr. | 83/608 |
| 1,794,178 | 2/1931 | Karcher | 56/295 |
| 2,779,409 | 1/1957 | Becker | 83/608 |
| 3,035,359 | 5/1962 | Ewert | 56/295 |
| 3,080,697 | 3/1963 | Mauro | 56/295 |
| 3,093,952 | 6/1963 | Bonser | 56/295 |
| 3,496,819 | 2/1970 | Blum | 83/608 |
| 3,589,112 | 6/1971 | Frohmader | 56/295 |
| 3,601,960 | 8/1971 | Buechler | 56/295 |

Primary Examiner—Louis G. Mancene
Assistant Examiner—Paul J. Hirsch
Attorney, Agent, or Firm—William E. Mouzavires

[57] ABSTRACT

A cutting blade assembly for a lawn mower is provided with mechanism for prestressing the blade to lessen vibration during use and also for adjusting the blade so as to accurately position and align the blade relative to the associated blade housing so that the blade operates in a horizontal plane. This prestressing and adjusting mechanism may also be employed to compensate for any misalignment in the mounting of the blade spindle relative to the blade housing. In one specific embodiment in which the blade is bolted to a blade support bar which, in turn, is fixed to a vertical spindle mounted centrally to the blade housing, the prestressing and adjusting mechanism is achieved by pressure-applying bolts or screws threaded through the blade support bar on opposite sides of the spindle so as to be engageable with the blade. Advancement of the screws serves to deflect the blade downwardly to prestress the blade and/or to position the blade in a desired horizontal plane. Lock nuts are provided about the screws to engage the blade support bar and fix the screws in position after adjustment.

16 Claims, 3 Drawing Figures

BLADE ASSEMBLY FOR LAWN MOWERS

BACKGROUND OF INVENTION

With advancement of lawn mower technology over the recent years, it has now become established that misalignment of the rotating lawn mower cutting blade relative to its horizontal plane of operation and its associated blade housing can seriously effect the performance of the mower. Misalignment of the cutting blade or its mounting to the associated mower housing can cause harmful contact between the extremities of the blade and the associated blade housing. This not only causes harmful wear on the parts and impairment of the blade speed and cutting operation but also it can adversely effect the flow of the cut grass clippings in the blade housing to cause clogging and stalling of the blade in some instances.

The need for an accurately aligned cutting blade operating within predetermined tolerances with respect to its associated housing becomes even more important when used with mowers which produce a high vacuum within the blade housing for facilitating the cutting of grass and the movement of the grass clippings out of the housing.

OBJECTS OF INVENTION

The present invention generally relates to lawn mower blade assemblies of the type which operate in a horizontal plane usually within a blade housing to cut grass which is eventually discharged from the blade housing.

It is an object of the present invention to provide an improved blade assembly for a rotary lawn mower which may be precisely aligned in a desired horizontal plane and with predetermined spacings or tolerances between the outer extremities of the blade and the associated blade housing. Included herein is the provision of such a blade assembly which may be properly positioned and aligned as stated despite misalignment of its associated spindle relative to the vertical.

Another important object of the present invention is to provide an improved blade assembly for a rotary lawn mower which may be easily prestressed to a desired degree to help to eliminate or reduce vibration during use.

A further object of the present invention is to provide such an improved lawn mower blade assembly which may be properly aligned and positioned or prestressed after the blade has been mounted relative to its spindle so as to avoid the necessity of disassembly of the blade in order to effect such adjustments.

Another object of the present invention is to provide a novel mechanism for adjusting a rotary lawn mower blade relative to its associated housing to place the blade in a desired precise position for operation and/or to prestress the blade. Included herein is the provision of such a mechanism which is easily adjustable to provide a relatively wide range of blade adjustments.

Another object of the present invention is to provide a novel adjustment mechanism for a lawn mower blade assembly which will achieve the above stated objects in connection with conventional rotary cutting blades and spindle mountings thereof, and which may be easily applied to new or existing mowers without sacrificing performance.

SUMMARY OF INVENTION

The present invention may be summarized in connection with a conventional blade assembly for a lawn mower which includes a blade mounting bar which is fixed in a horizontal plane to the lower end of a vertical spindle for rotation therewith. The spindle, in turn, is provided with a mount which is fixed to the blade housing usually in the center thereof to be driven by a conventional engine usually mounted above the blade housing. The cutting blade itself is conventionally secured to the blade mounting bar to rotate therewith through means of bolts which extend through apertures in the blade and the blade mounting bar on opposite sides of the spindle. The cutting blade is locked secure to the blade mounting bar by lock nuts fastened on the bolts which extend through the blade and the blade mounting bar.

In accordance with one preferred embodiment of the present invention, a pair of pressure screws are threaded in threaded apertures provided in the blade mounting bar on opposite sides of the spindle and outwardly of the bolts which serve to fix the cutting blade to the blade mounting bar. The ends of the pressure screws are thus engageable with portions of the cutting blade itself so that any advancement of the pressure screws within the blade mounting bar serve to apply a force to the blade which is utilized for adjusting the position of the blade and also for imposing a prestress on the blade. Once the blade is adjusted in the desired position, lock nuts provided about the adjusting screws are secured against the blade mounting bar to hold the blade adjustment.

DRAWINGS

Other objects and advantages of the present invention will become apparent from the following more detailed description taken in conjunction with the drawings in which.

DETAILED DESCRIPTION

Figure 1:
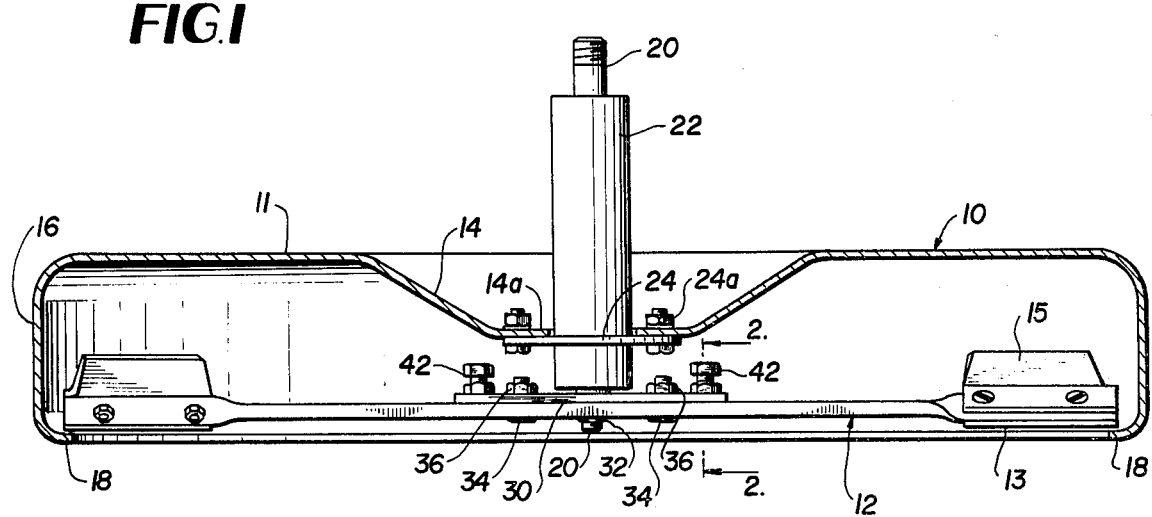
FIG. 1 is a cross sectional, elevational view of a lawn mower blade housing incorporating a blade assembly in accordance with a preferred embodiment of the present invention.
Figure 2:
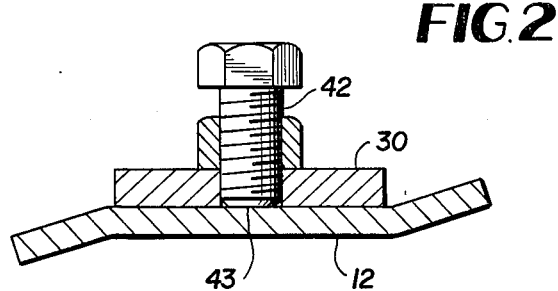
FIG. 2 is an enlarged, fragmental, cross-sectional view taken generally along lines 2—2 of FIG. 1.

Referring now to the drawings in detail, there is shown in FIG. 1 for illustrative purposes only, a blade housing for a lawn mower generally designated 10 which may be a walk-behind mower or a riding mower supported for movement over the ground surface by means which are not shown as they form no part of the present invention. Mounted for rotation in a horizontal plane within the blade housing is a cutting blade generally designated 12 whose opposite extremities include cutting edges 13 and upstanding air impellers 15. Blade housing 10 includes, in the specific embodiment shown, a top deck generally designated 11 which extends in a horizontal plane, a depressed inverted frustoconical portion 14 in the center of the deck 11, and an outer cylindrical peripheral skirt 16 which encloses a chamber in which grass is cut and conveyed circularly with the housing, the latter being aided by the upstanding blade impellers 15 which produce an upward draft. Grass clippings are discharged from the blade housing by a discharge port (not shown) in any suitable manner. In the specific embodiment shown, the housing skirt 16 is provided in its lower extremities with an inturned circular lip 18 for enhancing the vacuum effect within the blade housing for facilitating movement of the grass clippings through and out of the housing. A more detailed description of the specific housing and blade impeller portions described above may be found in pending U.S. Application Ser. No. 784,740, entitled "Riding Mower With Grass Collecting System", assigned to the assignee of the present invention.

Cutting blade 12 is mounted for rotation within the housing by means of a spindle assembly including a vertical spindle 20, the lower end of which is provided with threads and received through a passage located centrally through cutting blade 12 where a lock nut 32 is provided on the lower threaded end of the spindle as shown in FIG. 1. The spindle assembly itself which may be conventional, further includes a spindle housing 22 containing bearings in which spindle 20 is mounted for rotation about a vertical axis coinciding with the vertical axis of spindle 20. Spindle housing 22 has fixed thereto and projecting radially therefrom, a circular flange 24 which is fixed by nut and bolt assemblies 24 to the central portions 14a of the blade housing as best shown in FIG. 1. In this manner, the spindle assembly is secured to the blade housing. Although not shown, the spindle is powered by a suitable or conventional engine either mounted on the blade housing or at the rear of the case of a riding mower in which a belt transmission system may be utilized to impart to the spindle, the drive from the engine.

Cutting blade 12 is secured to spindle 20 to be rotatable together with the spindle by means of a blade support or mounting bar generally designated 30 which, in the preferred embodiment shown, is a rectangular rigid steel bar. Blade mounting bar 30 is provided with a central threaded aperture in which is threaded the lower threaded portion of spindle 20. Cutting blade 12 is fixed to blade mounting bar 30 by means of nut and bolt assemblies located on opposite sides of the spindle. These assemblies include bolts 34 received through apertures in cutting blade 12 and blade mounting bar 30, and lock nuts 36 secured on bolts 34 to firmly secure cutting blade 12 to blade mounting bar 30 at two equally spaced points on opposite sides of the spindle as best shown in FIG. 1. It will be seen that rotation of spindle 20 will cause rotation of blade mounting bar 30 in a horizontal plane, together with cutting blade 12 which is fixed to blade mounting bar 30 in the manner aforesaid.

When the blade assembly is mounted to the spindle, it is highly desirable that the cutting edges 13 of the cutting blade 12 lie in a predetermined horizontal plane relative to the lower portions of the housing skirt 16. Moreover, in the specific embodiment shown which utilizes an inturned lip 18 on the lower extremity of housing skirt 16, it is important that the cutting edges 13 of the cutting blade be spaced a predetermined equal distance above the inturned lip 18 as shown in FIG. 1. In addition, it has been found highly advantageous to impose a prestress on the cutting blade 12 to alleviate vibration in the cutting assembly during operation.

In accordance with the present invention, a novel blade adjustment mechanism is provided for achieving the aforegoing objectives. This adjustment mechanism is provided by a pair of pressure applying members which, in the specific embodiment, are shown as threaded bolts 42 mounted in threaded apertures provided in blade mounting bar 30 on opposite sides of the spindle and outwardly of the nut and bolt assemblies 34, 36 which secure cutting blade 12 to blade mounting bar 30. The pressure-applying members are located at equal distances from the center of rotation of the cutting blade 12 which, of course, coincides with the spindle axis.

Figure 3:
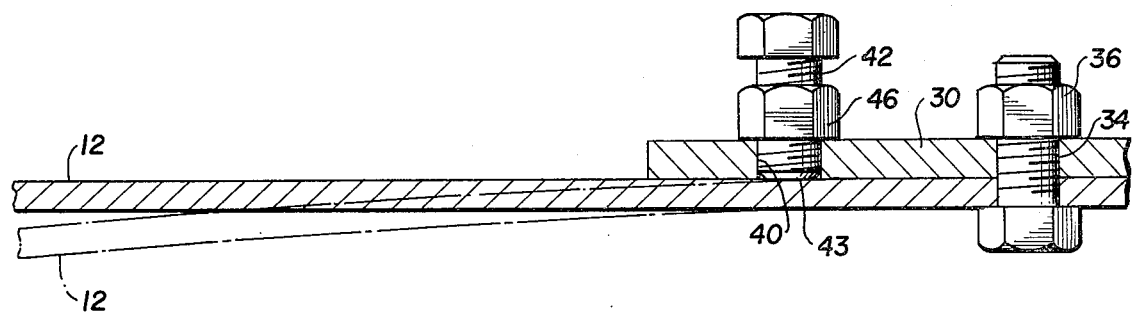
FIG. 3 is an enlarged, cross-sectional view of a portion of the blade assembly of the present invention including phantom lines illustrating an adjusted position of the cutting blade included in the blade assembly.

Referring to FIG. 3, by advancing pressure-applying members 42 within blade mounting bar 30, the ends 43 of the pressure-applying members will engage the top surface of cutting blade 12 to impose a force thereon to deflect the cutting blade 12 downwardly as shown to an exaggerated degree in FIG. 3. This adjustment of the cutting blade 12 is utilized to not only properly position the cutting edges 13 in a proper horizontal plane but also to impose a prestress on cutting blade 12 which will reduce vibration during use. Once the desired adjustment is achieved, the position of pressure-applying bolts 42 is fixed by means of lock nuts 46 provided about bolts 42 to firmly engage the top surface of blade mounting bar 30 as best shown in FIG. 3. If it is desired to relieve the prestress on the cutting blade 12 or to adjust the cutting blade upwardly from a previously adjusted position, the pressure-applying bolts 42 are retracted in a direction away from the cutting blade 12.

The adjustment mechanism of the present invention may be utilized after the blade assembly has been mounted in the blade housing to the spindle. The latter, of course, is necessary when the blade 12 is being adjusted to position its cutting edges 13 in a proper horizontal plane relative to the lower extremities of the housing skirt 16. Moreover, it should be understood that although the blade housing of the present invention utilizes an inturned lip 18, the adjustment mechanism of the present invention may be utilized in connection with blade housings which do not utilize inturned lips 18 but in which it is nevertheless highly desirable that the cutting edges 13 be placed in a proper position relative to the lower extremities of the skirt.

In addition, it should be understood that although a specific blade housing has been shown in order to describe the present invention, other blade housings may be utilized together with the blade assembly and adjustment mechanism of the present invention. Further, in this latter regard, the adjustment mechanism of the present invention may be utilized with conventional blade assemblies and blade housings.

It will further be appreciated that the adjustment mechanism of the present invention may not only be utilized to compensate for irregularities in the tolerances between the cutting blade and the housing skirt 16 but also, for irregularities in the spindle mounting to the blade housing.

In one preferred embodiment where the cutting blade 12 is approximately twenty-five to twenty-eight inches in length and where the blade support bar 30 is approximately twelve inches long one and one-half inches wide, and seven-sixteenths of an inch in thickness; one-half inch diameter pressure bolts 42 are utilized at centers spaced approximately one-half of an inch from the end extremity of the blade support bar 30. In addition, the centers of the pressure-applying bolts are spaced approximately two inches outwardly from bolts 34 utilized to secure the cutting blade 12 to blade mounting bar 30.

What is claimed is:

1. In a lawn mower having a blade assembly including a cutting blade and a blade mounting means for mounting and rotating the blade in a generally horizontal plane; the improvement comprising means mounted on the blade assembly for applying a force to the blade in a direction generally normal to the general horizontal plane of the blade for prestressing the blade and for deforming the blade to adjust the position of the blade relative to the blade mounting means.

2. The blade assembly defined in claim 1 wherein said blade mounting means includes a spindle, a blade mounting member fixed to the spindle to be rotatable therewith, fastening means securing the blade to the blade mounting member to be rotatable therewith, and wherein said means for applying force to the blade includes a pressure screw threaded through one of said blade and blade mounting member and engageable with the other of said blade and blade mounting member.

3. The blade assembly defined in claim 2 wherein said last recited means further includes a lock nut received about said screw and engageable with said one of said blade and blade mounting member.

4. The blade assembly defined in claim 3 wherein said screw is threaded in said mounting member and has an end engageable with the blade.

5. The blade assembly defined in claim 4 wherein said blade mounting member overlies said blade.

6. The blade assembly defined in claim 5 wherein said blade mounting member is a rigid bar.

7. A blade assembly for use in a lawn mower and wherein the blade assembly includes a rotatable spindle to be mounted in a generally vertical plane, blade mounting means fixed to the spindle to be rotatable therewith, and means securing the blade to the blade mounting means to be rotatable therewith; the improvement comprising pressure-applying means mounted on the blade assembly and located on opposite sides of the spindle for applying a force to deform and move the blade in a vertical plane to adjust the position of the blade relative to said blade mounting means while prestressing the blade.

8. The blade assembly defined in claim 7 wherein said last recited means includes pressure applying members mounted to said blade mounting means for movement relative thereto into or out of engagement with said blade.

9. The blade assembly defined in claim 8 wherein said pressure applying members include a pair of screws threaded within said blade mounting means with the ends of the screws engageable with the blade.

10. The blade assembly defined in claim 9 wherein said screws are provided with lock nuts engageable with the blade mounting means.

11. The blade assembly defined in claim 10 wherein said screws are located at equal distances from the spindle.

12. The blade assembly defined in claim 11 wherein said blade is fixed to said blade mounting means at points spaced outwardly of the spindle on opposite sides thereof and wherein said screws are located along the blade outwardly of the points wherein the blade is fixed to said blade mounting means.

13. The blade assembly defined in claim 12 wherein said blade mounting means is a bar overlying the blade and extending outwardly of the spindle in a horizontal plane.

14. The blade assembly defined in claim 8 wherein said pressure-applying members are equally spaced from said spindle on opposite sides thereof.

15. The blade assembly defined in claim 14 wherein said pressure-applying members are spaced radially outwardly from said means securing the blade to the blade mounting means.

16. In a lawn mower including a blade housing including a peripheral skirt, and a blade assembly mounted to the housing including a cutting blade rotatable within the housing generally in a horizontal plane; the combination comprising a peripheral lip extending inwardly from a bottom portion of the skirt, the blade having extremities located in a plane above said lip, and blade adjusting and prestressing means included in the blade assembly for deforming and adjusting the blade in a vertical plane relative to said lip to place the extremities of the blade a predetermined distance above said lip while prestressing the blade, and wherein said blade assembly includes a vertical spindle mounted to the housing, a blade mounting means fixed to the spindle to be rotatable therewith about a vertical axis, means securing the cutting blade to said blade mounting means to be rotatable therewith, and wherein said blade adjustment means is mounted to one of said blade and blade mounting means and engageable with the other of said blade and blade mounting means, and wherein said blade adjustment means includes two pressure-applying members located on opposite sides of the spindle respectively.

* * * * *